United States Patent
Gardner et al.

(10) Patent No.: US 11,512,739 B1
(45) Date of Patent: Nov. 29, 2022

(54) BEARING ASSEMBLY FOR TRACK AND MOVER SYSTEM

(71) Applicant: Rockwell Automation Technology, Inc., Mayfield Heights, OH (US)

(72) Inventors: Eric Gardner, Milwaukee, WI (US); Juan A. Fernandez, Thiensville, WI (US); Alexander Tsantes, Baptistown, NJ (US); Alex Mummert, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 30 days.

(21) Appl. No.: 17/313,582

(22) Filed: May 6, 2021

(51) Int. Cl.
| F16C 29/12 | (2006.01) |
| F16C 29/00 | (2006.01) |
| B65G 39/14 | (2006.01) |
| B65G 54/02 | (2006.01) |

(52) U.S. Cl.
CPC .............. F16C 29/12 (2013.01); B65G 39/14 (2013.01); B65G 54/02 (2013.01); F16C 29/005 (2013.01)

(58) Field of Classification Search
CPC ...... F16C 29/12; F16C 29/005; F16C 29/123; F16C 29/126; B65G 39/14; B65G 54/02; B65G 17/20; B65G 19/025
See application file for complete search history.

(56) References Cited

U.S. PATENT DOCUMENTS

| 5,273,367 | A | * | 12/1993 | Tanaka | F16C 29/0633 384/54 |
| 5,620,259 | A | * | 4/1997 | Mainardi | F16C 29/045 384/57 |
| 5,642,941 | A | * | 7/1997 | Mouezy | B23Q 1/40 384/57 |
| 6,876,107 | B2 | | 4/2005 | Jacobs | |
| 8,189,301 | B2 | | 5/2012 | Schreiber | |
| 8,789,678 | B2 | | 7/2014 | Kleinikkink et al. | |
| 8,973,980 | B2 | | 3/2015 | Mildner et al. | |
| 9,481,521 | B2 | | 11/2016 | Fourney et al. | |
| 9,555,720 | B2 | * | 1/2017 | Aumann | B60L 13/03 |
| 9,604,795 | B2 | * | 3/2017 | Aumann | B65G 54/02 |
| 10,029,855 | B2 | | 7/2018 | Grosskreuz et al. | |
| 10,193,484 | B2 | | 1/2019 | Wernersbach et al. | |
| 10,273,094 | B2 | | 4/2019 | Wernersbach et al. | |
| 10,707,740 | B2 | | 7/2020 | Rubin | |
| 10,894,675 | B2 | * | 1/2021 | Hartung | B65G 54/02 |
| 2002/0097528 | A1 | | 7/2002 | Williams et al. | |
| 2017/0305471 | A1 | | 10/2017 | Gami et al. | |
| 2019/0367290 | A1 | | 12/2019 | Papsdorf et al. | |
| 2020/0271160 | A1 | * | 8/2020 | Ruiz | F16C 17/22 |
| 2021/0099119 | A1 | * | 4/2021 | Sun | B65G 35/06 |
| 2022/0081218 | A1 | * | 3/2022 | Götzinger | B65G 35/066 |
| 2022/0144316 | A1 | * | 5/2022 | Forster | B61C 13/04 |

FOREIGN PATENT DOCUMENTS

JP 5539394 B2 7/2012

* cited by examiner

Primary Examiner — Mark A Deuble
(74) Attorney, Agent, or Firm — Fletcher Yoder, P.C.

(57) ABSTRACT

The present disclosure describes bearing assemblies for a mover of a linear motor system. The bearing assemblies may include a plurality of bearings, a housing that retains the bearings, a plurality of springs biasing at least one of the plurality of bearings towards a track of the linear motor system, and at least one dampening element dampening movement of one or more of the plurality of springs.

20 Claims, 6 Drawing Sheets

BEARING ASSEMBLY FOR TRACK AND MOVER SYSTEM

BACKGROUND

The present disclosure relates generally to linear drive transport systems, and more particularly, to bearing assemblies of movers in linear drive transport systems.

A range of linear motors are known and in use throughout industry, particularly in manufacturing, filling, and material handling applications. Such motors typically include an elongated track in which motor coils are associated with a stator core, such as a laminated core. The coils may have various orientations, depending upon the motor design. A permanent magnet mover may be placed on the track, and fields resulting from selective energization of the track coils interact with permanent magnets of the mover to cause the mover to move along the track in desired directions, speeds, and accelerations, and to stop and start at desired locations. Highly flexible and precise control of movement of one or many movers may be achieved by control and driver circuitry associated with the coils of the track sections.

Traditionally, the tracks utilized in linear drive transport systems maintain constant trajectories around paths. For example, in traditional configurations, the mover may lose contact between one or more bearings as the mover enters or exits a curve in the track. When the mover briefly loses contact with the tracks at significant rates of speed, efficiency is lost and increased wear on both the mover and the tracks may be experienced due to erratic motion. Accordingly, as discussed herein, altering the configuration of a bearing assembly of the mover may enable the bearings of the mover to maintain contact with the track to limit wear, increase operational velocity, and increase operational efficiency.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes bearing assemblies present in movers in linear drive transport systems. The bearing assemblies bias bearings into engagement with track portions of the linear drive transport systems. Biasing the bearings into engagement reduces instances of bouncing and/or bumping as the mover travels along the track by ensuring the bearings stay in contact with the track. Dampening elements within the bearing assemblies also reduce vibrations as the mover travels along the track. The bearing assemblies are also designed to be removably coupled to the movers and replaceable due to wear, load conditions, and/or other operating factors to accomplish a particular task. Technical effects of the disclosed techniques include reducing wear and prolonging operational lifetime of bearings and movers, providing a modular system for replacing bearing assemblies within a mover, and providing interchangeability for bearing assemblies based on wear conditions, load conditions, and other operating factors.

In an embodiment, a bearing assembly for a mover of a linear motor system includes a plurality of bearings that interface with a track of the linear motor system and a housing that retains the plurality of bearings. In the embodiment, the housing includes a first spring extending inward from a perimeter of the housing. The first spring biases a first bearing of the plurality of bearings toward a first portion of the track. The housing also includes a second spring extending inward from the perimeter of the housing. The second spring biases a second bearing of the plurality of bearings towards a second portion of the track. The housing also defines a recess disposed at least partially between the first spring and the second spring. The bearing assembly also includes a dampening element at least partially disposed within the recess. The dampening element dampens movement of the first spring.

In another embodiment, a bearing assembly for a mover of a linear motor system including a plurality of bearings that interface with a track of the linear motor system and a housing that retains the plurality of bearings. In the embodiment, the housing includes a first spring that biases a first bearing of the plurality of bearings toward a first portion of the track and a second spring that biases a second bearing of the plurality of bearings toward a second portion of the track. The housing also includes a cross-member disposed between the first spring and the second spring. The housing also defines a first recess disposed at least partially between the cross-member and the first spring. The bearing assembly also includes a dampening element at least partially disposed in the first recess, wherein the dampening element dampens movement of the first spring.

In yet another embodiment, a mover of a linear motor system includes a body defining a cavity and a bearing assembly disposed within the cavity. The bearing assembly includes a plurality of bearings that interface with a track of the linear motor system and a housing that retains the plurality of bearings. The housing includes a first spring that biases a first bearing of the plurality of bearings towards a first portion of the track and the housing also defines a first recess. The bearing assembly also includes a dampening element at least partially disposed within the recess, wherein the dampening element dampens movement of the first spring.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1A:
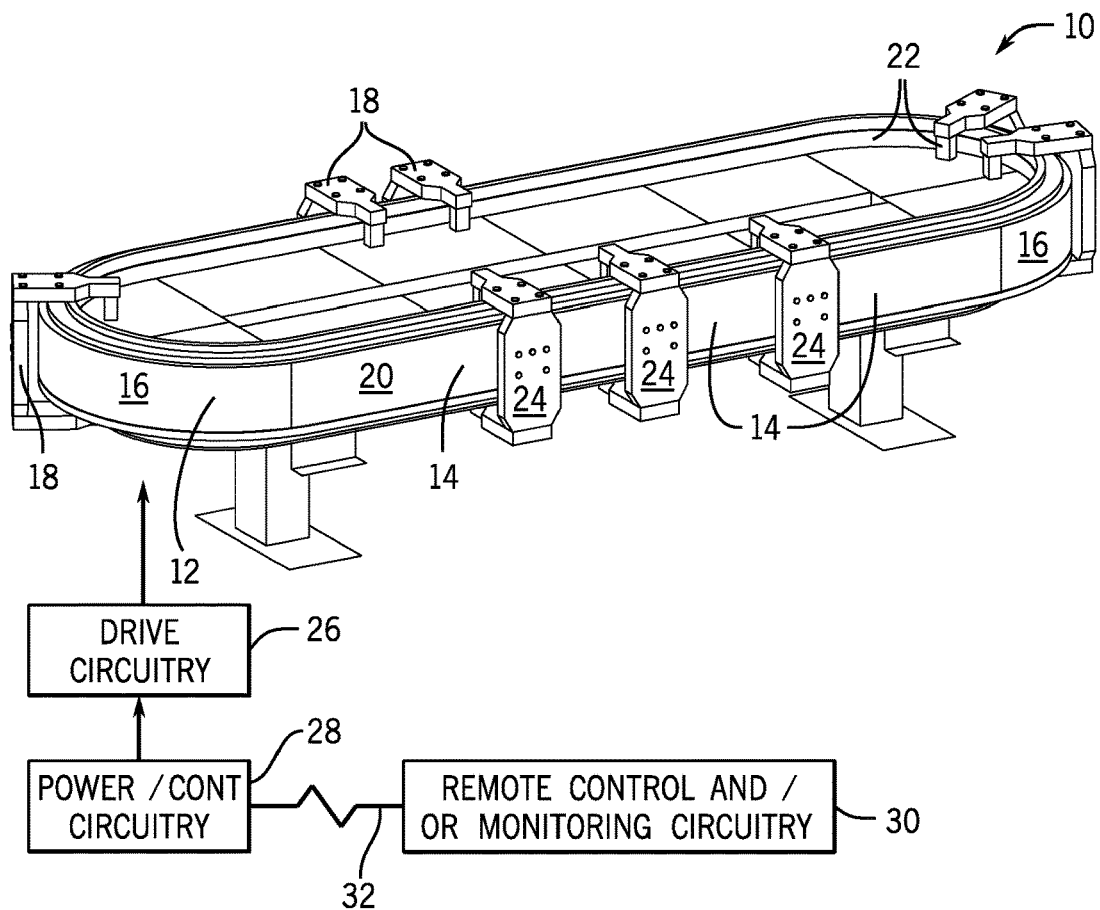
FIG. 1A is a perspective view of an exemplary linear motor system illustrating straight and curved track modules and several movers positioned for movement along the modules, in accordance with embodiments described herein.

Turning now to the drawings, and referring first to FIG. 1A, a linear motor system 10 as illustrated for moving articles or products around a track 12. As will be appreciated by those skilled in the art, in many applications, the linear motor system 10 may inter-operate with other machines, robots, conveyers, control equipment, and so forth (not separately shown) in an overall automation, packaging, material handling or other application. The linear motor system 10 may generally be referred to a "linear motor" as discussed below, in which the moving components are positioned, accelerated, decelerated, and generally moved under the influence of controlled magnetic and electromagnetic fields. In the illustrated embodiment, the track 12 comprises multiple straight track sections 14 and multiple curved track sections 16. These sections may be generally self-contained and mountable in various physical configurations, such as the oval illustrated in FIG. 1A. It should be noted that other configurations are also possible as discussed below. The configurations may form closed loops of various shapes, but may also include open-ended segments. The linear motor system 10 may also include one or more movers 18, which may be mounted to and movable along the track 12. Again, the position, velocity, acceleration, and higher order derivative parameters are controllable for these movers 18 by appropriate control of the coils of the system that are energized and de-energized. In the illustrated embodiment, the movers 18 interact with stationary elements in and around an outer periphery 20 of the track sections 16, although other configurations are envisaged. A sensor system 22 is provided to detect positions of the movers 18 around the track 12, and such sensor systems may include permanent magnets, energized coils, Hall effect sensors, or any other suitable devices. In general, one component of the sensor system 22 may be mounted on the movers 18, while another component will be mounted at fixed locations around the track 12.

Each mover 18 may include a mounting platform 24. In an actual implementation, various tools, holders, support structures, loads, and so forth may be mounted to this mounting platform 24. The movers 18 themselves may be configured differently from those shown in order accommodate the various loads. While a horizontal configuration is illustrated in FIG. 1A, other orientations may also be provided, such as ones in which the illustrated oval is generally stood on a side or end, or at any angle between.

The linear motor system 10 may also include circuitry for controlling a movement of the movers. In the embodiment illustrated in FIG. 1A, this circuitry may include drive circuitry 26 that provides signals to each track section 16, and specifically individual coils of the track sections 16 to create electromotive forces that interact with magnets on the track sections 16 to drive the movers 18 to specific locations, and at specific velocity, accelerations, and so forth. This drive circuitry 26 may typically include inverter circuitry that makes use of power electronic switches to provide drive power to the individual coils of each module in a controlled manner. In some embodiments, the drive circuitry 26 may be included in each individual track section 16, and signals provided to the drive circuitry 26 by power and control circuitry 28. This power and control circuitry 28 (and the drive circuitry 26) may receive feedback from the movers 18 and/or from the sensor system 22 to detect the location, velocity, acceleration, and so forth of each mover 18. In certain embodiments the movers 18 may also be recognized by the power and control circuitry 28 as individual axes that are independently controlled, but with regulation of their position, velocity, and acceleration to avoid conflicts, collisions, and so forth. The particular motion profile implemented by the power and control circuitry 28 may typically be implemented upon the design and commissioning of the linear motor system 10, depending upon the particular task to be performed. Finally, various remote control and/or monitoring circuitry 30 may be provided and may be linked to the linear motor system 10 by one or more networks 32. Such remote circuitry 30 may generally allow for coordination of the operation of the linear motor system 10 with other automation components, machine systems, manufacturing and material handling machines, and so forth.

Figure 1B:
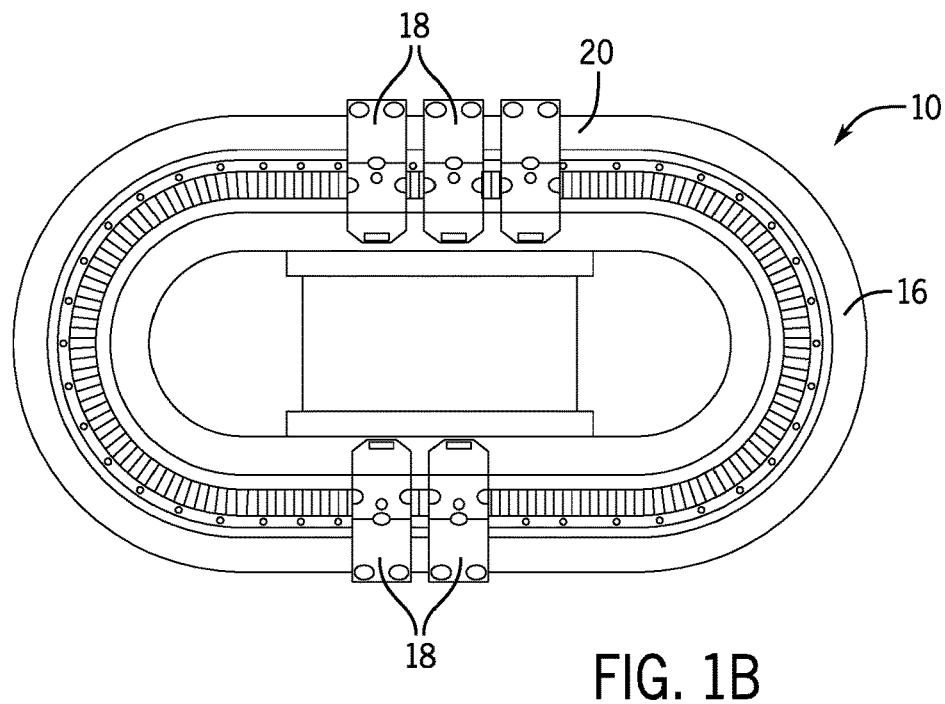
FIG. 1B is a top view of a similar linear motor system in which motor coils are positioned differently than in the system of FIG. 1A, in accordance with embodiments described herein.

FIG. 1B illustrates an alternative configuration for a similar linear motor system 10. However, in this configuration, rather than motor coils being positioned around the periphery of the system 10, coils are positioned around the top of the system 10, in a generally planar arrangement. Magnet assemblies of each mover 18 face these coils and are spaced from the coils by a small air gap. Straight and curved track modules are assembled, as above, to form an oval, although other shapes and layouts may be formed. The curved track modules may be adapted with modified spline geometries, as in the case of the system shown in FIG. 1A, and as described in greater detail below.

Figure 2:
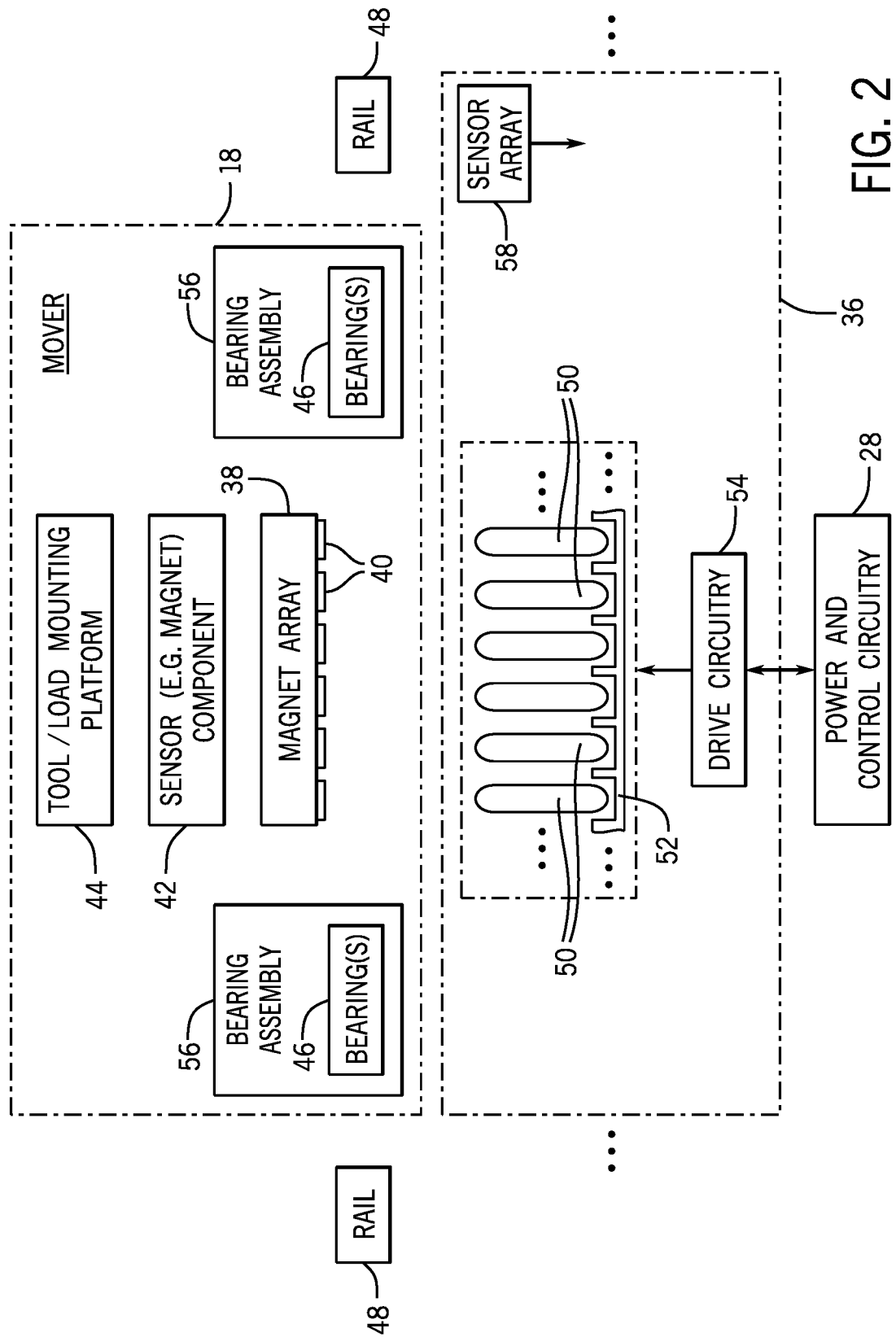
FIG. 2 is a diagrammatical representation of the system of FIGS. 1A and 1B, in accordance with embodiments described herein.

FIG. 2 is a diagrammatical representation of the linear motor system 10 showing one track section 36 and one mover 18 positioned along the track section 36. The track section 36 illustrated in FIG. 2 may be a straight or curved track section, these two differing in their physical configuration, and certain of the actual characteristics owing to the curved nature of the curved sections as discussed below. In general, however, each mover 18 may include a magnet array 38 on which a number of magnets 40 may be mounted. These magnets 40 may be permanent magnets and are mounted such that a small air gap is provided between the magnets 40 and coils of the track section 36. As shown in FIG. 2, the mover 18 may also include a sensor component 42, such as a permanent magnet. It should be noted, however, that the particular sensor component 42 included in the mover 18 may depend upon the nature of the sensing strategy, the sensing resolution, the position of the sensor 42 on the mover 18 (and cooperating components on the track module), and so forth. The platform 44 is provided on the mover 18 for mounting tools and the like as discussed above. Finally, bearings 46 and associated components (e.g., rollers) are mounted to the mechanical structure of the mover 18 and may serve to interact with one or more rails of the track 48. These bearings 46 and rails of the track 48 may allow the mover 18 to remain securely attached to the track section 36 while allowing relatively free movement of the movers 18 along the track section 36 and supporting mechanical loads and forces encountered during motion. Each mover 18 may include any number of bearing assemblies 56 to couple bearings 46 to a housing of the mover 18. As described in more detail below, the bearing assemblies 56 may include, in addition to the bearings 46, a spring component, and a dampening component. The spring component provides a biasing force that biases the bearing 46 against the track section 36, and also allows relative movement between the mover 18 and the track section 36. The dampening component counters the biasing force provided by the spring component to dampen the relative movement between the mover 18 and the track section 36.

The track module 36 may include a series of parallel coils 50 that are associated with a stator or armature 52. In currently contemplated embodiments, these coils 50 may be mounted into slots in the stator 52, and the stator 52 itself may be made of magnetic material formed into a stack of laminates and structured to allow for mounting within the track section 36 housing. Particular configurations, magnetic structures, mounting structures and the like of the coils 50 and stator 52 components are generally beyond the scope of the present disclosure. Drive circuitry 54 may be included in each track module 36 as discussed above to allow for controlled power signals to be applied to the coils 50 in order to drive and position the movers 18 appropriately around the track module 36. Finally, a sensor array 58 is provided in each track section 36 to allow for interaction with the sensor components 42 of the movers 18. This sensor array 58 may provide feedback that can indicate the position of the movers 18, and can be used to derive velocity, acceleration, jerk, and other motion parameters. In the illustrated embodiment, a number of track sections 36 may be mounted end-to-end and interconnected with one another and/or with the power and control circuitry 28 to received signals used to power the coils 50.

As will be appreciated by those skilled in the art, track sections 36, along with the magnet arrays 38 of the movers 18, may generally form what may be considered the linear motor system 10. That is, electromotive force is generated by the controlled fields of the coils 50 and interaction between these fields and the magnetic fields of the magnet array 38 serve to drive the mover 18 into desired positions, at desired speeds, and so forth. As noted above, these coils 50 and the linear motor itself may be designed in accordance with various configuration strategies, such as ones having the coils 50 arranged around a periphery of the track modules 36, ones in which the coils 50 are generally planar (in a top or bottom position of the modules 36), and so forth. Although the "linear" motor system 10 may be used in the present disclosure, it should be appreciated that curved modules in various configurations are intended to be included in the scope of the present disclosure.

Figure 3:
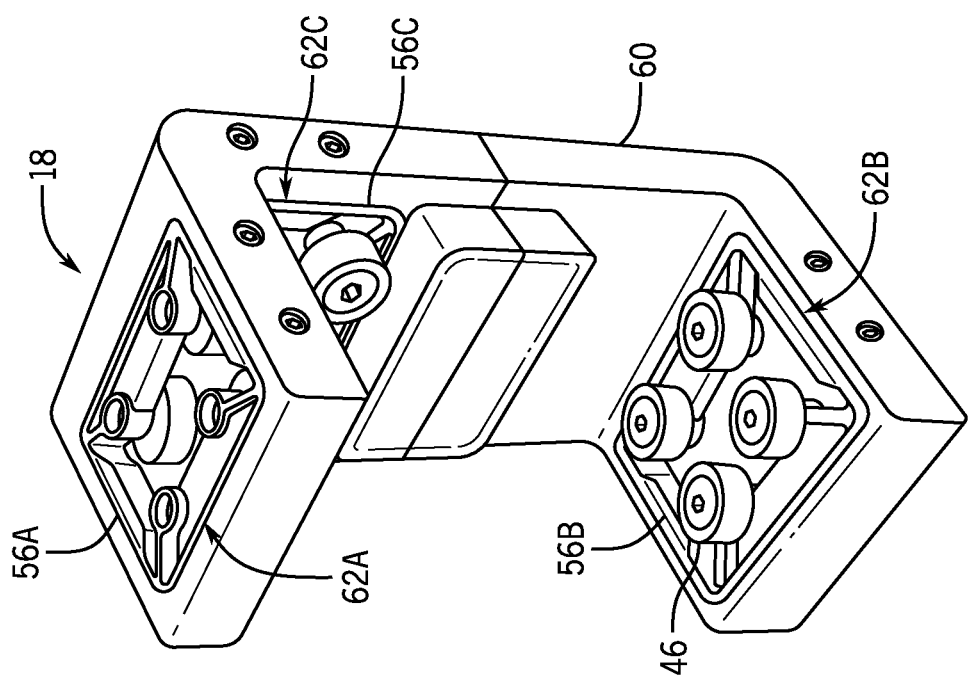
FIG. 3 is a perspective view of one of the movers of FIG. 1A including a number of bearing assemblies, in accordance with embodiments described herein.

With the foregoing in mind, FIG. 3 illustrates a perspective view of the mover 18 of FIG. 1 including a number of bearing assemblies 56A, 56B, 56C, in accordance with an embodiment of a present disclosure. The mover 18 may include a body 60 having any number of recesses or cavities (e.g., recesses 62A, 62B, 62C). The recesses 62A, 62B, 62C may be at least partially disposed through a portion of the mover 18, such as through the body 60. Each recess 62A, 62B, 62C may receive and retain a corresponding bearing assembly 56A, 56B, 56C. While the mover 18 in FIG. 3 includes three bearing assemblies 56A, 56B, 56C, any number of bearing assemblies 56 may be incorporated in the mover 18 and each bearing assembly 56 may include any number of bearings 46. Each bearing assembly 56A, 56B, 56C may be removably coupled to the mover 18. For example, each bearing assembly 56 may be fastened and secured to the mover 18. In some embodiments, each bearing assembly 56 may be replaceable in order to provide maintenance to the mover 18. For example, the bearing assemblies 56 may be replaced due to worn out bearings 46, faulty bearings 46, and so forth. Additionally or alternatively, one or more bearing assemblies 56 of the mover 18 may be replaced with a different bearing assembly in order to accommodate different loads on the mover 18. For example, different bearing assemblies 56 may include different types of bearings 46, different types of springs (e.g., spring elements, arms, flanges, linear springs, variable rate springs, constant force springs, leaf springs, compression springs, torsion springs, extension springs, Belleville springs, flat springs, Magnetic Spring, Disk spring, tension spring, spiral (clock) spring, progressive force spring, dowel pin springs, Electrostatic spring, electromagnetic spring, or any other suitable type of springs, as described in further detail below), different types of dampening elements (e.g., inserts, overmolded components, dashpots that provide resistance to motion, piezo electric dampener, magnetic dampener, electromagnetic dampener, magnetorheological dampener, mechanical dampener, or any other suitable dampening element, as described in further detail below), a different number of bearings 46, and so forth. As such, an appropriate bearing assembly 56 may be selected for each task based on a function of the linear motor system, the bearing assembly 56, and/or any portion thereof (e.g., any number of factors including mover load, mover speed, mover size, bearing lifetime, product environment, and so forth.) Additionally, the different types of bearing assemblies 56 may include an indication of an appropriate function (e.g., mover load, mover speed, mover size, bearing lifetime, product environment, and so forth) for the bearing assembly 56 and/or any portion thereof. For example, a portion of the bearing assembly 56 may be colored and/or marked to indicate a maximum and/or minimum mover load for the corresponding bearing assembly 56. Additionally or alternatively, a portion of the bearing assembly 56 may be colored and/or marked to indicate the bearing assembly 56 is suitable for a corresponding application, environment, and/or industry. For example, the portion of the bearing assembly 56 may be colored blue to indicate the bearing assembly 56 is suitable for hygienic environments and/or applications in the medical industry, such as in the manufacturing of medical equipment or tools. Additionally or alternatively, any number of components may be replaceable for the bearing assembly 56.

Figure 4:
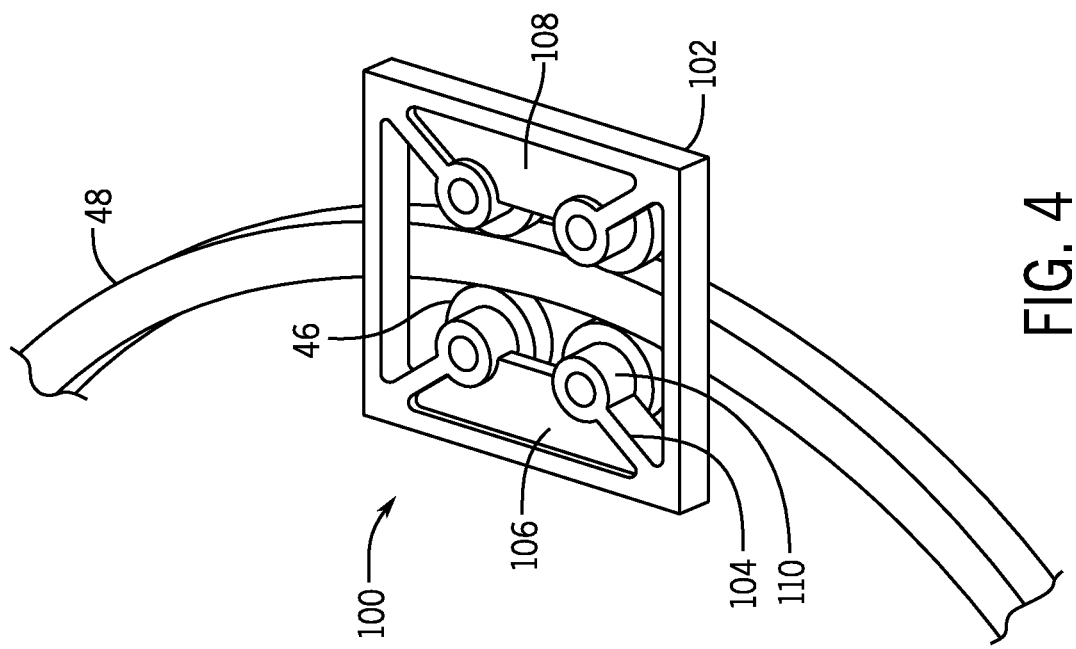
FIG. 4 is a perspective view of an example bearing assembly for the mover and a portion of track, in accordance with embodiments described herein.

With the foregoing in mind, FIG. 4 illustrates a perspective view of an example bearing assembly 100 disposed on the track 48, in accordance with an embodiment of the present disclosure. The bearing assembly 100 may be incorporated into a mover, such as mover 18 in FIG. 1, and the mover 18 may include any number of bearing assemblies 100. The bearing assembly 100 may include a housing 102, a spring element (e.g., arm 104), a first dampening element 106, a second dampening element 108, and any number of bearings 46. The housing 102 may be made of plastic, rubber, metal, a fiber-reinforced composite material, any combination thereof, or any other suitable material. The housing 102 may be generally rectangular or square in shape. For example, the housing 102 may have edges and/or corners that are radiused, chamfered, or otherwise deviate from a rectangular or square shape. Further, housings 102 of other shapes are also envisaged. In some embodiments, the housing 102 may include any number of arms 104. For example, the housing 102 may have four arms 104 and each arm may extend from a corner of the housing 102. The arms 104 may extend inward towards a center of a plane of the housing 102. In certain embodiments, each arm 104 may be coupled to the housing 102 at an interior corner of the housing 102. For example, each arm 104 may be integral with the housing 102 at a first end. Each arm 104 may include a head 110 at a second end and each head 110 may be coupled to a bearing 46. The head 110 may be coupled and may retain the bearing 46. In certain embodiments, the arm 104 may act as a spring, such as a leaf spring. As such, the arm 104 may bias a corresponding bearing 46 towards the track 48 and/or may bias the bearing 46 into engagement with the track 48. The biasing force exerted by the arm 104 may be tuned via a geometry of the arm 104, material used to manufacture the arm 104, various manufacturing parameters for the arm 104, etc.

The first dampening element 106 and the second dampening element 108 may be disposed between adjacent arms 104 of the bearing assembly 100. For example, a window or recess may extend partially or completely through the housing 102 and may be disposed between adjacent arms 104 of the bearing assembly 100 and the first dampening element 106 may be at least partially disposed in the window. In certain embodiments, the first dampening element 106 and the second dampening element 108 may be made of plastic, rubber, silicone, a polymer material, any combination thereof, or any other suitable material. As with the arms 104, geometry, material, manufacturing parameters, etc. may be selected and/or varied to give the dampening elements 106, 108 desired dampening qualities. In some embodiments, the first dampening element 106 and the second dampening element 108 may be trapezoidal in shape. A first side of the first dampening element 106 may be flush with an interior side of the housing 102 and a second side and third side of the first dampening element 106 may be flush with adjacent arms 104 of the housing 102. In some embodiments, the second side and the third side of the first dampening element 106 may include a contoured surface configured to be disposed about associated heads of the adjacent arms 104. A fourth side of the first dampening element 106 may be exposed and may be disposed between associated heads of the adjacent arms 104. The first dampening element 106 may engage one or more arms 104 of the housing 102. In certain embodiments, the first dampening element 106 may be an insert at least partially disposed in the window or recess of the housing 102. The first dampening element 106 may be installed in the bearing assembly 100 in any suitable manner. For example, the first dampening element 106 may be overmolded in the window between adjacent arms 104. Overmolding is a process by which a dampening element, such as the dampening elements 106, 108, may be added as an additional layer over a portion of the housing 102, such as the arms 104. Alternatively, the dampening elements 106, 108 may be insert molded into the window between adjacent arms 104 by injecting dampening element material into the window.

The dampening elements 106, 108 may engage one or more arms of the housing 102 as the mover 18 travels around the track 48. While the arms 104 act as springs to bias the bearings 46 into engagement with the track 48, the dampening elements 106, 108 may act as dampeners to reduce and control vibrations as the mover 18 travels around the track 48. For example, the mass of the mover and its load (if any), the arms 104, and the dampening elements 106, 108 may act as a mass-spring-dampener system with an associated bearing 46. The arms 104 may engage, may flex, and/or may vibrate against the dampening elements 106, 108 as the mover 18 travels around the track. The dampening elements 106, 108 may act as a dampener and may resist flex and/or may reduce vibrations of the arms 104 and associated bearings 46. In certain embodiments, each dampening element 106, 108, arms 104, and associated bearings 46 may act as a critically dampened mass-spring-dampener system. For example, a material, size, shape, and any other suitable aspect of the dampening elements 106, 108 may be selected to produce a dampening ratio substantially close (e.g., within fifteen percent, within ten percent, within five percent, within one percent, within half a percent, and so forth) to one. While the above description relates to the first dampening element 106, the second dampening element 108 may be substantially similar, such as in shape, composition, and/or function.

As the mover 18 travels around a curve of the track 48, an interior, curved surface of the track 48 may push against the bearings 46 and may move an interior set of arms 104 and the associated heads of the interior set of arms 104. Due to the centripetal force of the mover 18 traveling around the curve of the track 48, the track 48 may push against the interior set of arms 104 more than an exterior set of arms 104. For example, the track 48 may force the interior set of arms 104 closer together. As such, the interior set of arms 104 may permit an amount of flexure due to the force of the track pushing against the bearings 46. An exterior set of arms 104 may bias associated bearings 46 towards an exterior, curved surface of the track 48 as the mover 18 travels around the curve. As such, the exterior set of arms 104 may ensure the bearings 46 stay engaged with the track 48 as the mover 18 travels around the curve and provide more optimal turning. For example, a center-to-center distance between the bearings 46 on the exterior set of arms 104 may increase as the mover 18 travels around the curve and a center-to-center distance between bearings 46 on the interior set of arms 104 may decrease due to the centripetal force. As such, a travel path of the mover 18 around the track 48 may be optimized due to the flexure of the arms 104. In certain embodiments, the bearing assembly 100 may alter a shape, a geometry, and/or a configuration as the mover 18 travels around the curve due to the flexure of the arms 104. For example, any component of the bearing assembly 100, such as the housing 102 and/or the arms 104 may flex and change shape due to the centripetal force as the mover 18 travels around the curve. Accordingly, the interior and exterior arms 104 of the bearing assembly 100 may apply different biasing forces.

Figure 5:
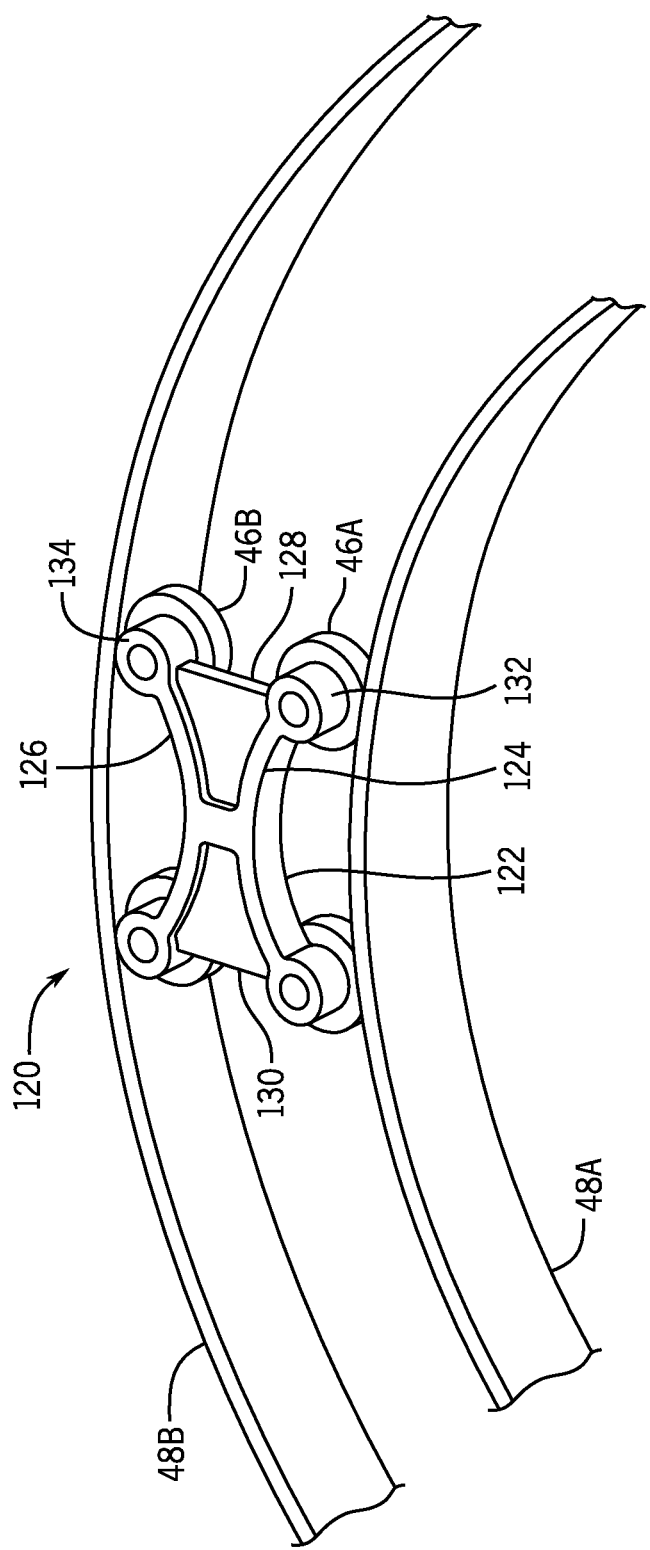
FIG. 5 is a perspective view of another example bearing assembly for the mover and portion of track, in accordance with embodiments described herein.

With the foregoing in mind, FIG. 5 illustrates another bearing assembly 120 disposed on a first portion 48A and a second portion 48B of a track, such as track 48 in FIG. 1, in accordance with an embodiment of the present disclosure. The bearing assembly 120 may be incorporated into a mover, such as mover 18 in FIG. 1, and the mover 18 may include any number of bearing assemblies 120. The bearing assembly 120 may include a housing 122, a first spring element (e.g., first arm 124), a second spring element (e.g., second arm 126) a first dampening element 128, a second dampening element 130, and any number of bearings, such as bearings 46A, 46B. The housing 122 may be made of plastic, rubber, metal, a fiber-reinforced composite material, any combination thereof, or any other suitable material. The housing 122 may be substantially x-shaped or H-shaped. In some embodiments, the housing 122 may include any number of arms, such as arms 124, 126. The first arm 124 and second arm 126 may be curved and/or may include a curved surface and may have a corresponding head 132, 134 located at each end of the arms 124, 126. For example, the housing 122 may have two arms and each arm may extend from the central portion of the housing 122 towards the track 48. The central portion of the housing 122 may be a cross-member, such as a flat, straight portion of the housing extending between the arms. The arms 124, 126 may extend outwards from the central portion of the housing 122 towards the track 48. In certain embodiments, each arm 124, 126 may be coupled to the housing 122 at the central portion. For example, each arm 124, 126 may be integral with the housing 122 at the central portion. Each arm 124, 126 may include a corresponding head 132, 134 at each end and each head 132, 134 may be coupled to and may retain an associated bearing 46. In certain embodiments, the arms 124, 126 may acts as a spring, such as a leaf spring. As such, the arms 124, 126 may bias one or more associated bearings 46 towards the track 48 and/or may bias the associated bearings 46 into engagement with the track 48. As shown, the first arm 124 may bias two bearings 46 towards a first (e.g., interior) portion 48A of the track 48. The second arm 126 may bias two bearings 46 towards a second (e.g., exterior) portion 48B of the track 48.

The first dampening element 128 may be disposed between a first portion of the first arm 124 and a first portion of the second arm 126. For example, a window may be disposed between the first portion of the first arm 124 and the first portion of the second arm 126 of the bearing assembly 100 and the first dampening element 128 may be at least partially disposed in the window. In certain embodiments, the first dampening element 128 and the second dampening element 130 may be made of plastic, rubber, silicone, a polymer material, any combination thereof, or any other suitable material. In some embodiments, the first dampening element 128 and the second dampening element 130 may be substantially trapezoidal in shape. A first side of the first dampening element 128 may be flush with the central portion of the housing 122, a second side of the first dampening element 128 may be flush with an interior surface of the first portion of the first arm 124, and the third side of the first dampening element 128 may be flush with the first portion of the second arm 126 of the housing 122. In some embodiments, the second side and the third side of the first dampening element 128 may include a contoured, curved surface configured to be disposed against the first arm 124 and the second arm 126. A fourth side of the first dampening element 128 may be exposed and may be disposed between associated heads of the first arm 124 and the second arm 126. The first dampening element 128 may engage the first arm 124 and/or the second arm 126 of the housing 122. In certain embodiments, the dampening elements 128, 130 may be inserts at least partially disposed in the window or recess of the housing 122. The dampening elements 128, 130 may be installed in the bearing assembly 120 in any suitable manner. For example, the first dampening element 128 may be overmolded in the recess between the arms 124, 126. For example, dampening elements 128, 130 may be added as an additional layer over a portion of the housing 122, such as the arms 124, 126. Alternatively, the dampening elements 128, 130 may be insert molded into windows between arms 124, 126 by injecting dampening element material into the windows.

The dampening elements 128, 130 may engage with one or more arms 124, 126 of the housing 122 as the mover 18 travels around the track 48. While the arms 124, 126 act as springs to bias the bearings 46A, 46B, respectively, into engagement with the portions 48A, 48B of the track 48, respectively, the first dampening element 128 may act as a dampener to reduce and control movement and/or vibrations as the mover 18 travels around the track 48. For example, mass of the mover and its load (if any), the first arm 124, and first dampening element 128, may act as a mass-spring-dampener system with an associated bearing 46A. The first arm 124 may engage, may flex, and/or may vibrate against the first dampening element 124 as the mover 18 travels around the first portion 48A of the track 48. The first dampening element 128 may act as a dampener and may resist and/or may reduce movement and/or vibrations of the first arm 124 and the second arm 126 and associated bearings 46A, 46B, respectively. In certain embodiments, each dampening element 128, 130, arms 124, 126, and associated bearings 46 may act as a critically dampened mass-spring-dampener system. For example, a material, size, shape, and any other suitable aspect of the dampening elements 128, 130 may be selected to produce a dampening ratio substantially close (e.g., within fifteen percent, within ten percent, within five percent, within one percent, within half a percent, and so forth) to one. While the above description relates to the first dampening element 128, the second dampening element 130 may be substantially similar, such as in shape, composition, and/or function.

As the mover 18 travels around a curve of the track 48, an interior, curved surface (e.g., first portion 48A) of the track 48 may push against the bearings (e.g., bearing 46A) coupled and retained by the first arm 124 and may move the first arm 124 and the associated heads of the first arm 124. Due to the centripetal force of the mover 18 traveling around the curve of the track 48, the first portion 48A of the track 48 may push against the first arm 124 less than the exterior, curved surface (e.g., second portion 48B) may push against the second arm 126. For example, the second portion 48B may force the associated heads of the second arm 126 further apart due to an amount of flexure of the second arm 126. As such, the second arm 126 may permit an amount of flexure due to the force of the track pushing against the bearings 46. The first arm 124 may bias associated bearings (e.g., bearing 46A) towards the first portion 48B of the track 48 as the mover 18 travels around the curve. As such, the first arm 124 may ensure the bearings 46 stay engaged with the track 48 as the mover travels around the curve and provide more optimal turning. For example, a center-to-center distance between the bearings 46B on the second arm 126 may increase as the mover 18 travels around the curve and a center-to-center distance between bearings 46A on the first arm 124 may decrease due to the centripetal force. As such, a travel path of the mover 18 around the track 48 may be optimized due to the flexure of the arms 124, 126. In certain embodiments, the bearing assembly 120 may alter a shape, a geometry, and/or a configuration as the mover 18 travels around the curve of the track 48 due to the flexure of the arms 124, 126. For example, any component of the bearing assembly 120, such as the housing 122, the first arm 124, and/or the second arm 126, may flex and change shape due to the centripetal force as the mover 18 travels around the curve. Accordingly, the first arm 124 and the second arm 126 of the bearing assembly 120 may apply different biasing forces.

Figure 6:
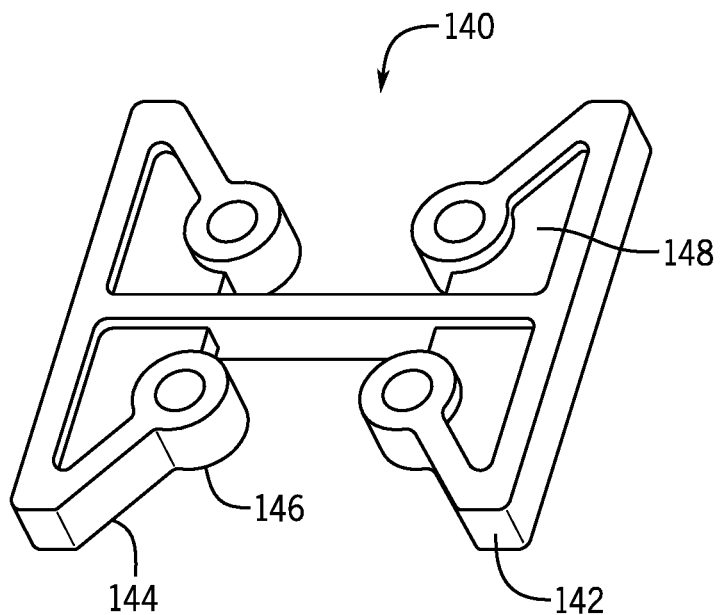
FIG. 6 is a perspective view of another example bearing assembly for the mover, in accordance with embodiments described herein.

With the foregoing in mind, FIG. 6 illustrates another bearing assembly 140, in accordance with an embodiment of the present disclosure. The bearing assembly 140 may be incorporated into a mover, such as mover 18 in FIG. 1, and the mover 18 may include any number of bearing assemblies 140. The bearing assembly 140 may include a housing 142, any number of spring elements (e.g., flanges 144), any number of heads 146, and any number of dampening elements 148. The housing 142 may be made of plastic, rubber, metal, a fiber-reinforced composite material, any combination thereof, or any other suitable material. In some embodiments, the housing 142 may include any number of flanges 144. Each flange 144 may include an associated arm portion and an associated head 146. Each head 146 may be located at a first end of the flange 144. For example, the housing 142 may have four flanges 144 and each arm may extend from a corner of the housing 142. The central portion of the housing 142 may include a cross-member, such as a flat, straight portion of the housing and two end members extending perpendicular to the cross-member. The two end members may be coupled to the cross-member at opposite ends of the cross-member. Each end member may be coupled to the cross-member at a middle portion of each of the end members. For example, each end member may be integral with the cross-member. In some embodiments, each end member may extend in two directions substantially perpendicular to the cross-member. The central portion of the housing 142 may have an I-shape and each flange 144 may extend from an associated outer edge of the I-shape. The arms of the flanges 144 may extend inwards towards the central portion of the housing 142, forming an acute (e.g., less than 90 degrees) angle. In certain embodiments, each flange 144 may be coupled to an associated end of the end members. For example, each flange 144 may be integral with the associated end of the end member. Each flange 144 may include a head 146 at one end and each head 146 may be coupled to and may retain an associated bearing, such as bearing 46 in FIG. 2. In certain embodiments, the flanges 144 may act as a spring, such as a leaf spring. As such, the flanges 144 may bias an associated bearing 46 towards the track 48 and/or may bias the associated bearing 46 into engagement with the track 48.

Figure 7:
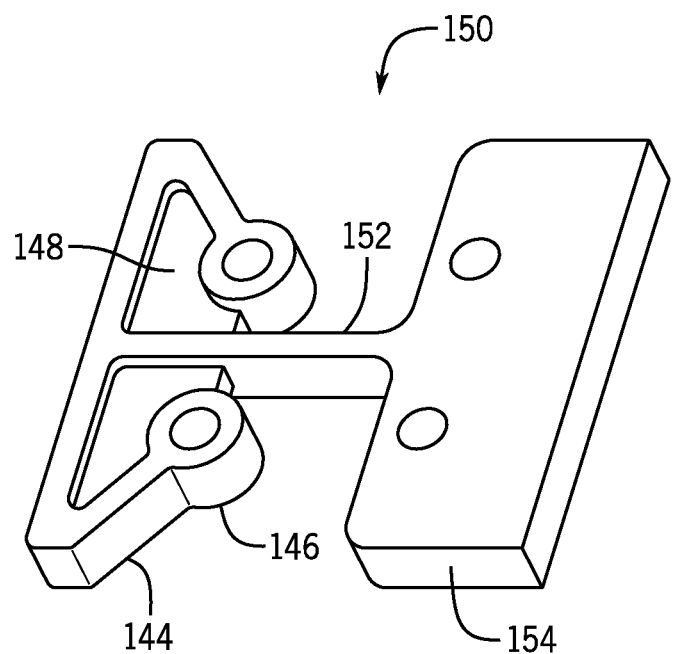
FIG. 7 is a perspective view of another example bearing assembly for the mover, in accordance with embodiments described herein.

A dampening element 148 may be disposed between an associated flange 144, the cross-member of the central portion of the housing 142, and an associated end member of the central portion of the housing 142. For example, a recess may be disposed between the associated flange 144, the cross-member, and the associated end member, extending partially or entirely through a depth of the housing 142, and the dampening element 148 may be at least partially disposed in the window. In certain embodiments, the dampening element 148 may be made of plastic, rubber, silicone, a polymer material, any combination thereof, or any other suitable material. In some embodiments, the dampening element 148 may be substantially triangular in shape. A first side of the dampening element 148 may be flush with the central portion (e.g., cross-member) of the housing 142, a second side of the dampening element 148 may be flush with an interior surface of the associated flange 144, and the third side of the dampening element 148 may be flush with the associated end member. In some embodiments, the second side of the dampening element 148 may include a contoured, curved surface configured to be disposed against the head 146 of the associated flange 144. The dampening element 148 may engage the flange 144 of the housing 142. In certain embodiments, the dampening element 148 may be an insert at least partially disposed in the window or recess of the housing 142. The dampening element 148 may be installed in the bearing assembly 140 in any suitable manner. For example, the dampening element 148 may be overmolded in the window against the flange 144. For example, the dampening element 148 may be added as an additional layer over a portion of the housing 142, such as the associated flange 144. Alternatively, the dampening element 148 may be insert molded into the recess by injecting dampening element material into the window. Each flange 144 of the housing 142 may have an adjacent recess formed between the associated flange 144, the cross-member, and an associated portion of the end members. As such, each recess may receive a dampening element 148. As shown in FIG. 7, housing 142 includes four recesses and four dampening elements 148.

The dampening elements 148 may engage one or more flanges 144 of the housing 142 as the mover 18 travels around the track 48. While the flanges 144 act as springs to bias the bearings 46 into engagement with the track 48, the dampening element 148 may act as a dampener to reduce and control movement and/or vibrations as the mover 18 travels around the track 48. For example, the mass of the mover and its load (if any), the flange 144 and the associated dampening element 148 may act as a mass-spring-dampener system with an associated bearing 46. The flange 144 may engage, may flex, and/or may vibrate against the associated dampening element 148 as the mover 18 travels around the track 48. The dampening element 148 may act as a dampener and may resist and/or may reduce vibrations of the flange 144 and an associated bearing 46. In certain embodiments, each dampening element 148, associated flange 144, and associated bearing 46 may act as a critically dampened mass-spring-dampener system. For example, a material, size, shape, and any other suitable aspect of the dampening elements 148 may be selected to produce a dampening ratio substantially close (e.g., within fifteen percent, within ten percent, within five percent, within one percent, within half a percent, and so forth) to one.

As the mover 18 travels around a curve of the track 48, an interior, curved surface of the track 48 may push against the bearings coupled and retained by the flanges 144 and may move the flanges 144 and the associated heads 146 of the flanges 144. Due to the centripetal force of the mover 18 traveling around the curve of the track 48, the track 48 may push against one flange 144 less than another flange 144. As such, the flanges 144 may permit the amount of flexure due to the force of the track pushing against the bearings 46. The flanges 144 may bias associated bearings 46 towards the track 48 as the mover 18 travels around the curve. As such, the flanges 144 may ensure the bearings 46 stay engaged with the track 48 as the mover travels around the curve and provide more optimal turning. For example, a center-to-center distance between the bearings 46 coupled to an interior set of flanges 144 may decrease as the mover 18 travels around the curve and a center-to-center distance between bearings 46 coupled to an exterior set of flanges 144 may increase due to the centripetal force. As such, a travel path of the mover 18 around the track 8 may be optimized due to the flexure of the flanges 144. In certain embodiments, the bearing assembly 140 may alter a shape, a geometry, and/or a configuration as the mover 18 travels around the curve due to the flexure of the flanges 144. For example, any component of the bearing assembly 140, such as the housing 142, the flanges 144, the end-member, and/or the cross-member may flex and change shape due to the centripetal force as the mover 18 travels around the curve. Accordingly, the interior and exterior set of flanges 144 of the bearing assembly 140 may apply different biasing forces.

With the foregoing in mind, FIG. 7 illustrates another bearing assembly 150, in accordance with an embodiment of the present disclosure. The bearing assembly 150 may include a housing 152, any number of spring elements (e.g., flanges 144), any number of heads 146, and any number of dampening elements 148. The housing 152 may be made of plastic, rubber, metal, a fiber-reinforced composite material, any combination thereof, or any other suitable material. In some embodiments, the housing 152 may include any number of flanges 144 and each flange 144 may be as described above in regards to FIG. 6. For example, the housing 152 may have two flanges 144 and each arm may extend from a corner of the housing 152. The central portion of the housing 152 may include a cross-member, such as a flat, straight portion of the housing, an end member perpendicular to the cross-member, and a flat, substantially rectangular end portion 154. The end member and the end portion 154 may be coupled to the cross-member at opposite ends of the cross-member. The end member may be coupled to the cross-member at a middle portion of the end member. For example, the end member may be integral with the cross-member. In some embodiments, the end member may extend in two directions substantially perpendicular to the cross-member. The end portion 154 may be coupled to the cross-member at a middle of the end portion 154. For example, the end portion 154 may be integral with the cross-member. The end portion 154 may include one or more apertures that may receive a portion of an associated bearing 46. The end portion 154 may be coupled to the bearings 46 at the apertures. For example, the apertures may receive a fastener to couple the bearings 46 to the end portion 154.

The arms of the flanges 144 may extend inwards towards the cross-member of the housing 152, forming an acute angle. In certain embodiments, each flange 144 may be coupled to an associated end of the end member. For example, each flange 144 may be integral with the associated end of the end members. Each flange 144 may include a head 146 at one end and each head 146 may be coupled to and may retain an associated bearing, such as bearing 46 in FIG. 2. In certain embodiments, the flanges 144 may act as a spring, such as a leaf spring. As such, the flanges 144 may bias an associated bearing towards the track 48 and/or may bias the associated bearing into engagement with the track 48. Each dampening element 148 may be as described above in regards to FIG. 6.

Figure 8:
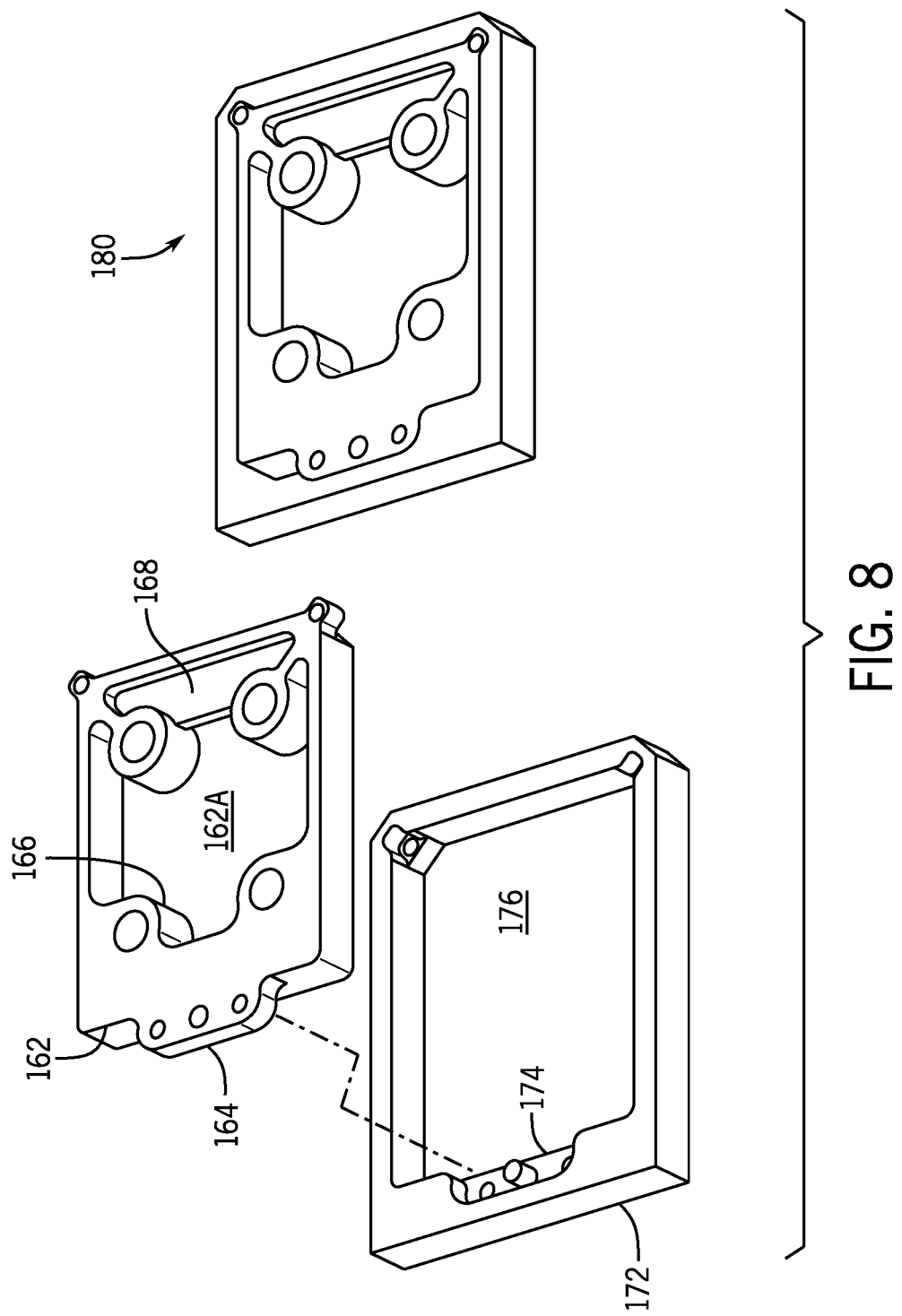
FIG. 8 is a perspective view of another example bearing assembly for the mover, in accordance with embodiments described herein.

With the foregoing in mind, FIG. 8 illustrates another bearing assembly 180, in accordance with an embodiment of the present disclosure. The bearing assembly 180 may include a housing 162, any number of spring elements, any number of dampening elements 168, and a frame 172. The housing 162 may be made of plastic, rubber, metal, a fiber-reinforced composite material, any combination thereof, or any other suitable material. The housing 162 may be substantially rectangular in shape and may include a window 162A therethrough. In some embodiments, the housing 162 may include any number of arms (e.g., spring elements) and each arm may be as described above in regards to FIG. 4. For example, the housing 162 may have two arms and each arm may extend from a corner of the housing 162.

The housing 162 may include a tab 164 and any number of flanges 166. The tab 164 may be disposed on the housing at an opposite end form the arms. The tab 164 may be a protrusion including a number of apertures that may receive a fastener. Each flange 166 may include an aperture that may receive a bearing, such as bearing 46. A recess may be formed in the housing 162 and the recess may be disposed between the arms of the housing 162. A dampening element 168 may be disposed in the recess. The dampening element 168 may be disposed between adjacent arms of the housing 162. In certain embodiments, the dampening element 168 may be made of plastic, rubber, silicone, a polymer material, any combination thereof, or any other suitable material. In some embodiments, the dampening element 168 may be substantially trapezoidal in shape. A first side of the dampening element 168 may be flush with an interior side of the housing 162 and a second side and third side of the dampening element 168 may be flush with arms of the housing 162. In some embodiments, the second side and the third side of the dampening element 168 may include a contoured surface configured to be disposed about associated heads of the adjacent arms. A fourth side of the first dampening element 168 may be exposed and may be disposed between associated heads of the adjacent arms and adjacent the window 162A of the housing 162. The dampening element 168 may engage one or more arms of the housing 162. In certain embodiments, the dampening element 168 may be an insert at least partially disposed in the window 162A or recess of the housing 162. The dampening element 168 may be installed in the bearing assembly 180 in any suitable manner. For example, the first dampening element 168 may be overmolded in the recess between adjacent arms. As such, the dampening element 168 may be added as an additional layer over a portion of the housing 162, such as the arms. Alternatively, the dampening element 168 may be insert molded into the recess between adjacent arms by injecting dampening element material into the recess.

The dampening elements 168 may engage one or more arms of the housing 162 as the mover 18 travels around the track 48. While the arms act as springs to bias the bearings 46 into engagement with the track 48, the dampening element 168 may act as a dampener to reduce and control vibrations as the mover 18 travels around the track 48. For example, mover and its load (if any), the arms, and dampening element 168 may act as a mass-spring-dampener system with an associated bearing 46. The arms may engage, may flex, and/or may vibrate against the dampening element 168 as the mover 18 travels around the track. The dampening element 168 may act as a dampener and may resist and/or may reduce movement and/or vibrations of the arms and associated bearings 46. In certain embodiments, the dampening element 168, arms, and associated bearings 46 may act as a critically dampened mass-spring-dampener system. For example, a material, size, shape, and any other suitable aspect of the dampening element 168 may be selected to produce a dampening ratio substantially close (e.g., within fifteen percent, within ten percent, within five percent, within one percent, within half a percent, and so forth) to one.

The frame 172 may include a recess 174 and a window 176 formed therethrough. The recess 174 may receive the tab 164 of the housing 162. For example, the recess 174 may be sized and shaped to accommodate the tab 164. The window 176 may receive a remainder of the housing 162. For example, the window 176 may be sized and shaped to accommodate the housing 162 such that an external surface of the housing 162 is substantially flush with an external surface of the frame 172. In certain embodiments, the housing 162 may be removably coupled to the frame 172. For example, the housing 162 may be coupled to the frame 172 by any number of fasteners. As such, the housing 162 may be a removable and replaceable component of the bearing assembly 180. The housing 162 may be replaced due to maintenance (e.g., bearing failure, bearing wear, and so forth) and/or to accommodate different mover loads.

The present disclosure includes bearing assemblies present in movers in linear drive transport systems. The bearing assemblies bias bearings into engagement with track portions of the linear drive transport systems. Biasing the bearings into engagement reduces instances of bouncing and/or bumping as the mover travels along the track by ensuring the bearings stay in contact with the track. Dampening elements within the bearing assemblies also reduce vibrations as the mover travels along the track. The bearing assemblies are also designed to be removably coupled to the movers and replaceable due to wear, load conditions, and/or other operating factors to accomplish a particular task. Technical effects of the disclosed techniques include reducing wear and prolonging operational lifetime of bearings and movers, providing a modular system for replacing bearing assemblies within a mover, and providing interchangeability for bearing assemblies based on wear conditions, load conditions, and other operating factors While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A bearing assembly for a mover of a linear motor system, comprising:
a plurality of bearings configured to interface with a track of the linear motor system;
a housing configured to retain the plurality of bearings, the housing comprising:
a first spring extending inward from a perimeter of the housing, wherein the first spring is configured to bias a first bearing of the plurality of bearings toward a first portion of the track;
a second spring extending inward from the perimeter of the housing, wherein the second spring is configured to bias a second bearing of the plurality of bearings towards a second portion of the track, wherein the housing defines a recess disposed at least partially between the first spring and the second spring; and
a dampening element at least partially disposed within the recess, wherein the dampening element is configured to dampen movement of the first spring.

2. The bearing assembly of claim 1, comprising a frame defining a window, wherein the housing is disposed in the window of the frame.

3. The bearing assembly of claim 2, wherein the housing is removably coupled to the frame.

4. The bearing assembly of claim 1, wherein the dampening element is made of a plastic material, a rubber material, a silicone material, a polymer material, or any combination thereof.

5. The bearing assembly of claim 1, wherein the dampening element includes a color, a geometry, a marking, or any combination thereof indicative of a function of the dampening element.

6. The bearing assembly of claim 1, wherein:
the first spring comprises a first arm;
the second spring comprises a second arm;
the first bearing of the plurality of bearings is coupled to the first arm at a first end of the first arm; and
the second bearing of the plurality of bearings is coupled to the second arm.

7. The bearing assembly of claim 6, wherein a third bearing of the plurality of bearings is coupled to the first arm at a second end of the first arm, and wherein the first arm is configured to bias the third bearing of the plurality of bearings towards a third portion of the track.

8. The bearing assembly of claim 6, comprising a third spring including a third arm, wherein the third arm is configured to bias a third bearing of the plurality of bearings towards a third portion of the track.

9. The bearing assembly of claim 8, comprising:
a fourth spring including a fourth arm, wherein the fourth arm is configured to bias a fourth bearing of the plurality of bearings towards a fourth portion of the track; and
a second recess disposed at least partially between the third arm and the fourth arm.

10. The bearing assembly of claim 9, comprising a second dampening element at least partially disposed in the second recess, wherein the second dampening element is configured to dampen movement of the third arm and the fourth arm.

11. The bearing assembly of claim 1, wherein the dampening element is removably coupled to the housing.

12. A bearing assembly for a mover of a linear motor system, comprising:
a plurality of bearings configured to interface with a track of the linear motor system;
a housing configured to retain the plurality of bearings, the housing comprising:
a first spring configured to bias a first bearing of the plurality of bearings toward a first portion of the track;
a second spring configured to bias a second bearing of the plurality of bearings toward a second portion of the track;
a cross-member disposed between the first spring and the second spring, wherein the housing defines a first recess disposed at least partially between the cross-member and the first spring; and a dampening element at least partially disposed in the first recess, wherein the dampening element is configured to dampen movement of the first spring.

13. The bearing assembly of claim 12, wherein the first spring comprises a flange, the flange including a flange head configured to retain the first bearing.

14. The bearing assembly of claim 12, wherein the housing comprises a second recess disposed at least partially between the cross-member and the second spring.

15. The bearing assembly of claim 12, wherein the dampening element is fixed to the housing.

16. A mover of a linear motor system, comprising:
a body defining a cavity;
a bearing assembly disposed within the cavity, wherein the bearing assembly comprises:
 a plurality of bearings configured to interface with a track of the linear motor system;
 a housing configured to retain the plurality of bearings, the housing comprising:
  a first spring configured to bias a first bearing of the plurality of bearings towards a first portion of the track;
  wherein the housing defines a recess; and
 a dampening element at least partially disposed within the recess, wherein the dampening element is configured to dampen movement of the first spring.

17. The mover of claim 16, wherein the housing comprises a second spring configured to bias a second bearing of the plurality of bearings towards a second portion of the track.

18. The mover of claim 17, wherein the dampening element is configured to dampen movement of the second spring.

19. The mover of claim 16, wherein the first spring comprises a first arm including a head configured to retain the first bearing.

20. The mover of claim 16, wherein the bearing assembly is removably coupled to the body.

* * * * *